UNITED STATES PATENT OFFICE.

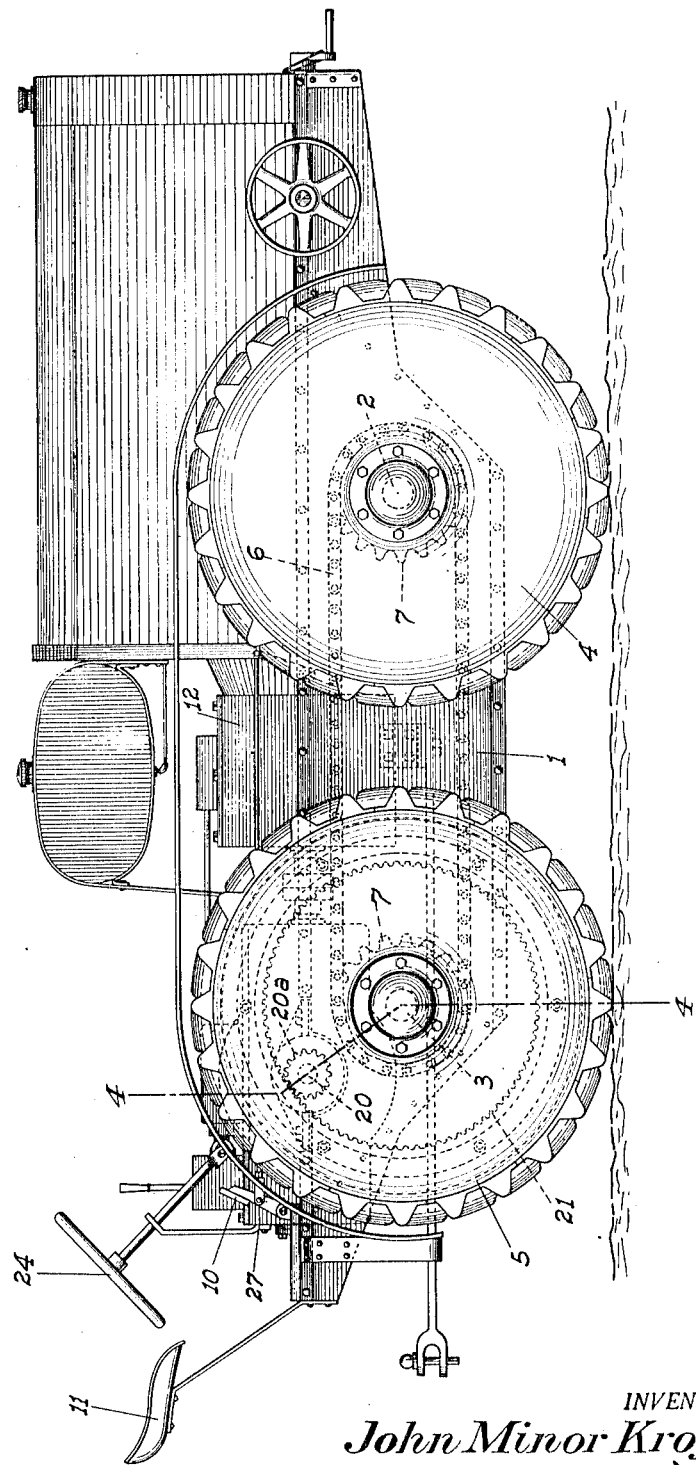

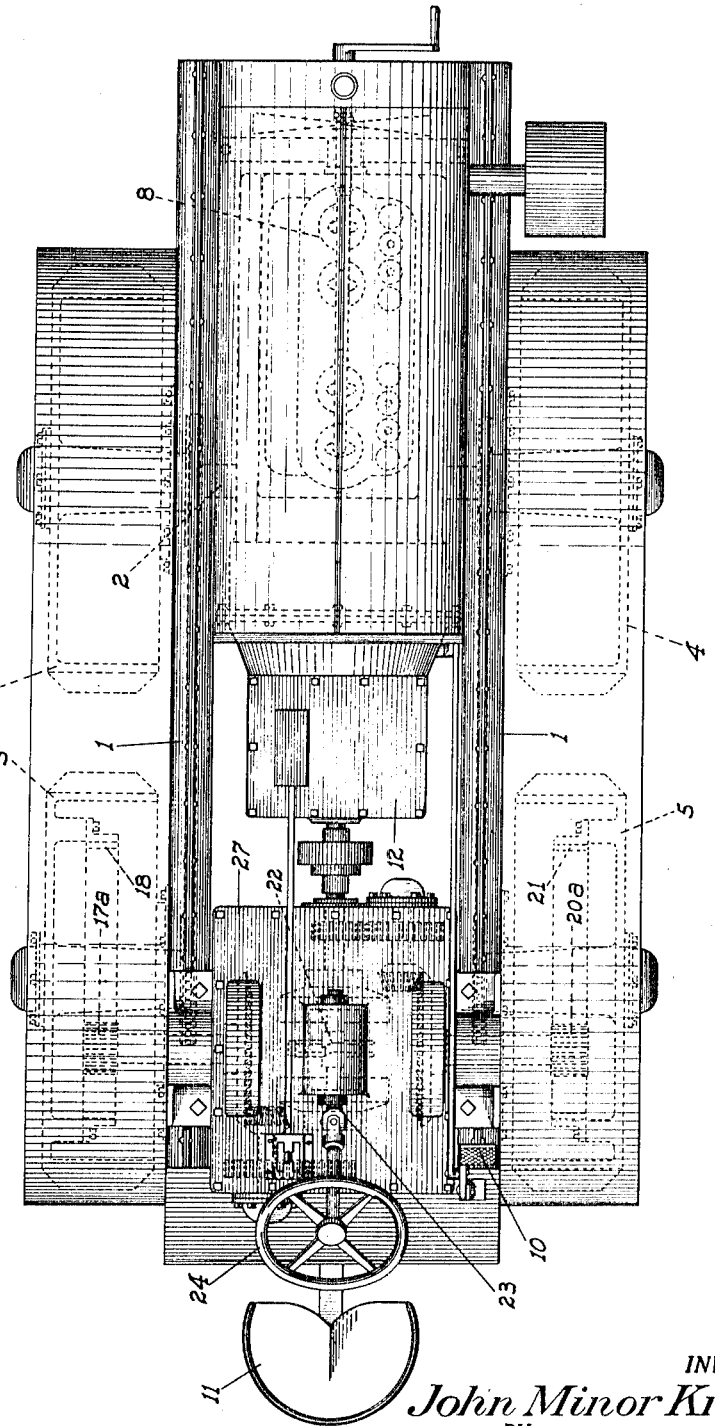

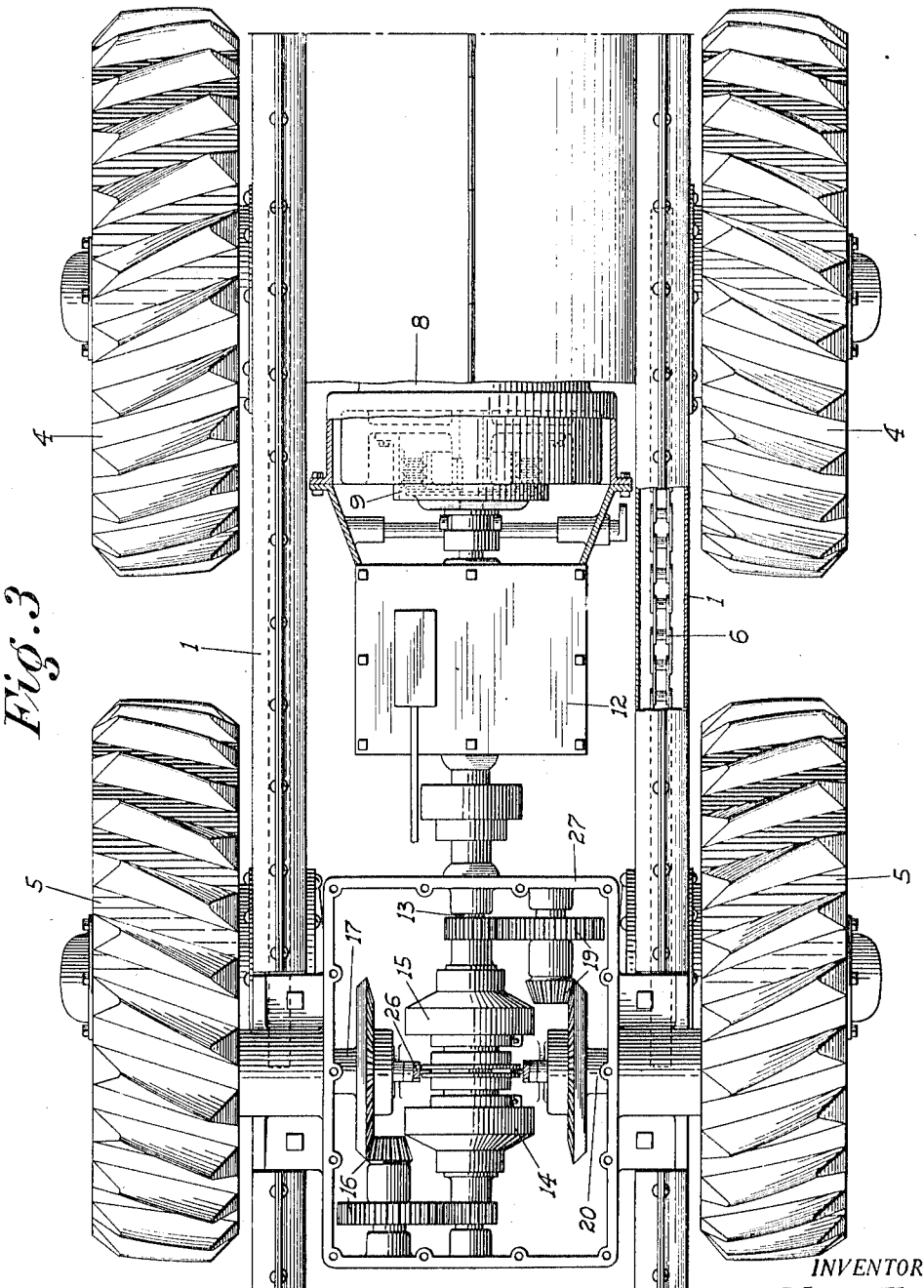

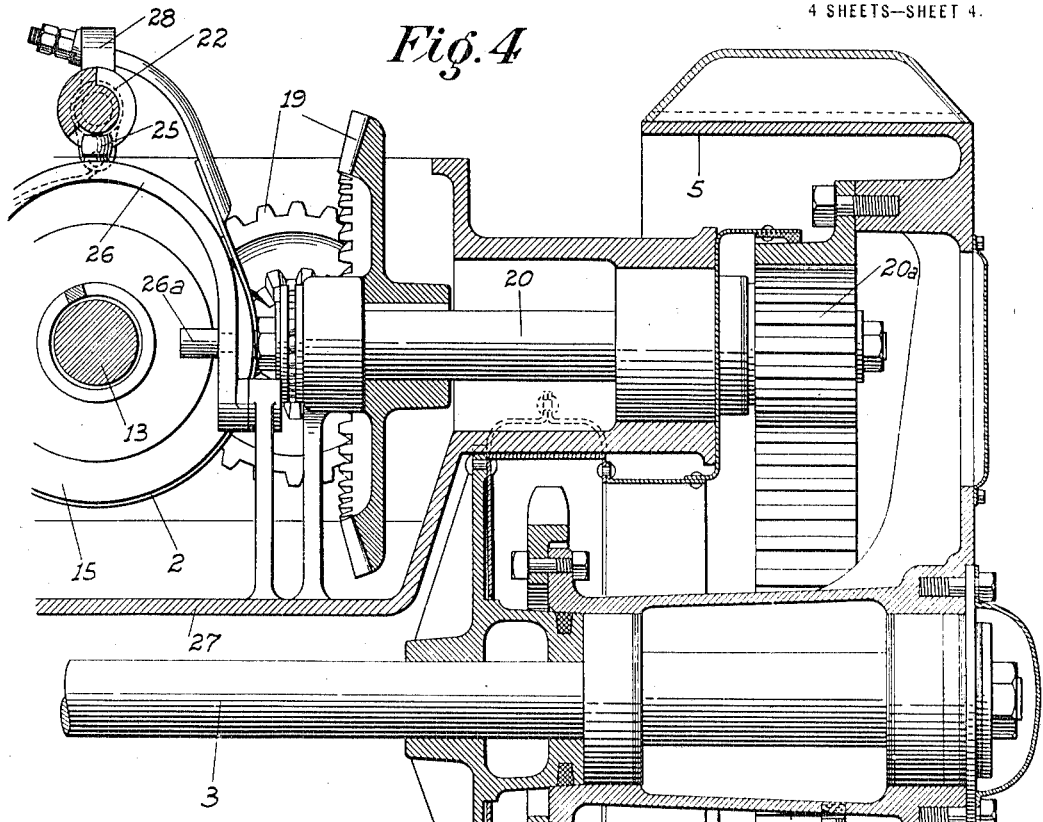
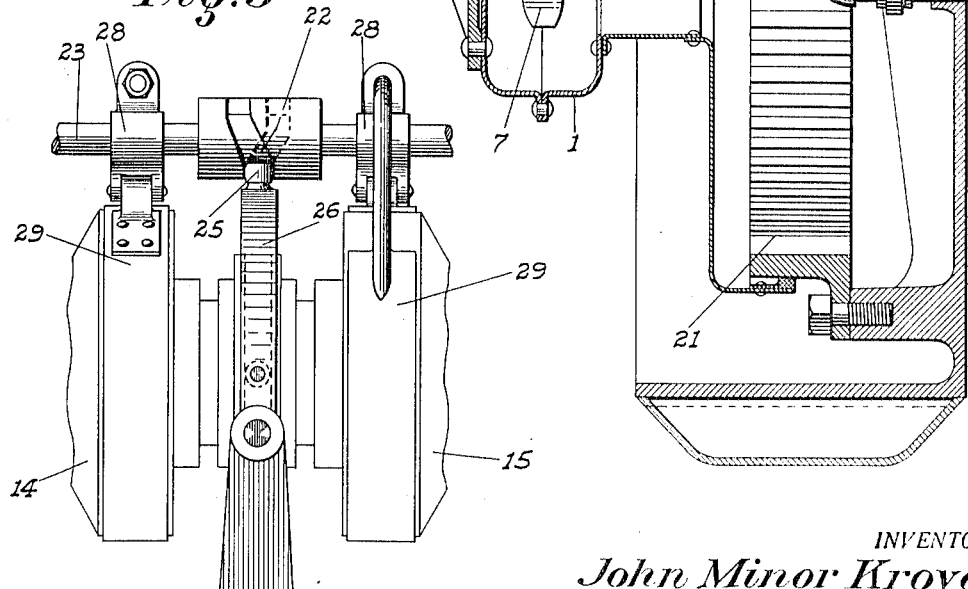

JOHN MINOR KROYER, OF STOCKTON, CALIFORNIA.

TRACTOR.

1,400,684.  Specification of Letters Patent.  Patented Dec. 20, 1921.

Application filed October 21, 1918. Serial No. 258,971.

*To all whom it may concern:*

Be it known that I, JOHN MINOR KROYER, a citizen of the United States of America, residing at Stockton, in the county of San Joaquin, State of California, have invented certain new and useful Improvements in Tractors; and I do declare the following to be a clear, full, and exact description of the same, reference being had to the accompanying drawings, and to the characters of reference marked thereon, which form a part of this application.

This invention relates to improvements in tractors embodying the general principles already set out in my pending application for patent filed May 6th, 1918, Serial Number 232,703.

This present application defines the specific driving relation between the power unit of the tractor and the driven wheels whereby the general principles of combined driving and steering, as set out in the above identified application, may be correctly applied.

The object of the present invention is to provide wheels arranged on the tractor in pairs, such wheels being held against lateral turning movement relative to the tractor, the wheels on either side of the tractor being connected in driving relation with each other, but only one pair being connected in driving relation with the power unit of the tractor. The wheels on one side of the tractor being turnably mounted on their axles independently of those on the other side, the latter driving connection is so arranged as to render it susceptible of being interrupted relatively to either or both of the last named wheels.

Thus, a complete cycle of movement may be had from the power unit to all the wheels or only to those wheels on one side of the tractor. Also, in addition to releasing the wheels on one side of the tractor from such driving connection, I may also lock them against rotation. By this means, the tractor may be steered in arcs of varying radii or it may be steered around directly at right angles to itself when short turns are to be made.

The advantage of my structure is that when the driven wheel makes any movement or stops movement entirely the remaining wheel on the same side being connected therewith follows the action thereof, so that they thus form an independent driving and control unit easily controllable by the dual clutch mechanism mentioned.

I have also provided a simple and inexpensive device, and yet one which will be exceedingly effective for the purposes for which it is designed.

These objects, I accomplish by means of such structure and relative arrangement of the parts as will fully appear by a perusal of the following specification and claims.

On the drawings, similar characters of reference indicate corresponding parts in the several views.

Figure 1 is a side elevation of the complete tractor.

Fig. 2 is a top plan view of the same.

Fig. 3 is a similar view, partly broken away and showing the clutch mechanisms.

Fig. 4 is a fragmentary cross section taken on a line 4—4 of Fig. 1.

Fig. 5 is a fragmentary side view of a dual clutch operating means.

Referring now more particularly to the characters of reference on the drawings, the numeral 1 designates the frame of the tractor to which are secured two rigid transverse axles 2 and 3 suitably spaced apart. Turnable on each of these axles are two wheels 4 and 5 respectively. Each pair of wheels on each side is held in driving connection by means of chains 6 passing over sprockets 7 secured to the wheels and turnable therewith.

Secured to the frame between the front wheels 4 is a motor 8 adjacent to the flywheel of which is a clutch 9 of any standard design, which clutch disconnects the motor from the transmission and is operated by means of a pedal connection 10 near the driver's seat 11. A transmission box 12 is positioned to the rear of the clutch 9, which contains suitable reverse and change speed mechanism.

To the rear of the transmission, the propeller shaft 13 therefrom is secured to one member of each of a pair of dual clutches 14 and 15, the free member of clutch 14 being connected through suitable gearing 16 to a shaft 17 having a pinion 17ª thereon which meshes with an annular gear 18 in one of the wheels 5, the corresponding member of clutch 15 being connected through similar gearing 19 with a shaft 20 having a pinion 20ª thereon meshing with an annular gear 21 in the other one of the wheels 5.

This dual clutch is operated by means of a suitably zig-zag grooved member 22 on a shaft 23 turnable by the wheel 24. A roller 25 on a fork 26 pivotally mounted to the housing 27 of the clutch mechanism rides in the groove, the fork having pins 26ª projecting between the clutches, and on turning the wheel 24 one way or the other, one or the other of the clutches 14 and 15 is thrown out of engagement to release the same from driving engagement with the shaft 13. The shaft 23 has also a member 28 on each side of the member 22, each of which is connected to the brake bands 29 of the clutches 14 and 15 in opposite or reverse order, in such a manner that a turn of the shaft 23 a certain distance will cause one of the clutches to be thrown out of engagement and a further turning of the shaft in the same direction will cause the brake band on that clutch to be tightened thereon, thereby firmly locking the same and its coacting connections together if it is desired to do so.

Referring to the fragmentary view of the clutches and their operating means as shown in Fig. 5 of the drawings, the clutches are both in operative connection with the shaft 13, and the fork 26 is in a vertical neutral position.

When the fork moves say to the left, by reason of the member 22 being turned to thus actuate the same, the clutch 15 remains in driving connection with the shaft 13 while the clutch 14 is forced out of driving connection by means of the rollers 26ª on the fork pressing against the flange of said clutch.

In operation, when the tractor is to be run in a straight path, both clutches are thrown in. When a turn to either side is to be made, however, the wheel 24 is turned to throw out the clutch which is on the side toward which the turning movement is to be made. This causes the wheels on that side to lose their driving power, and the wheels on the other side continuing to rotate under the influence of the power unit, force the tractor around in the arc of a circle whose center is on the side of the tractor on which the wheels have been thrown out of gear. The degree of curvature followed by the tractor during such turning movement may be regulated to a nicety by means of the clutch control wheel 24, for should the wheel be turned to bind the brake band on the clutch, the wheels will be held locked against rotation and the tractor will describe a sharp curve and will turn around almost in its own track, a feature which is of great service when working in orchards or in making an abrupt turn on reaching the end of a field and it is desired to return in a path immediately adjacent to its former path.

Should it be desired to turn through an arc of large radius, the wheel 24 may be turned just sufficiently to cause the clutch on the side desired to slip, so that those wheels will turn, but with a greatly diminished force, so that the tractor will turn in the direction desired, but not in such an abrupt manner, as when one of the brakes is set.

Thus, from the foregoing description it will readily be seen that I have produced such a device as substantially fulfils the objects of the invention as set forth herein.

While this specification sets forth in detail the present and preferred construction of the device, still in practice, such deviations from such detail may be resorted to as do not form a departure from the spirit of the invention, as defined by the appended claims.

Having thus described my invention, what I claim as new and useful and desire to secure by Letters Patent is:—

1. In a tractor, a propeller shaft, a pair of clutches thereon, the female members of the clutches being each connected in driving relation with a wheel on each side of the tractor, and the male members being both mounted in constant driving relation on the propeller shaft and arranged to normally engage the female clutch members, a common yoke between the male members of the clutches and bearing thereagainst, and a common means for moving said yoke in either direction to disengage the corresponding clutch.

2. In a tractor, a propeller shaft, a pair of clutches thereon, the female members of the clutches being each connected in driving relation with a wheel on each side of the tractor, and the male members being both mounted in constant driving relation on the propeller shaft and arranged to normally engage the female clutch members, a common yoke between the male members of the clutches, a roller on said yoke, a hand turned shaft mounted above the yoke and a zig-zag grooved member carried by the last named shaft and engaging the roller, whereby with a turning of said shaft in either direction the yoke will be moved to engage the male member of the corresponding clutch and disengage the same from the female member.

3. In a tractor, a propeller shaft, a pair of clutches thereon, the female members of the clutches being each connected in driving relation with a wheel on each side of the tractor, and the male members being both mounted in constant driving relation on the propeller shaft and arranged to normally engage female clutch members, a common yoke between the male members of the clutches and bearing thereagainst, a hand turned shaft mounted above the yoke, means on said shaft for engaging the yoke to move the same in either direction, lugs on the shaft, and brake bands connected to the arms and encircling the female members of the clutches, the bands being arranged in reverse relation to each other whereby only that band on the clutch disengaged by the movement of the yoke will be actuated to clamp therearound after said clutch is disengaged.

4. In a tractor, a propeller shaft, a pair of clutches thereon, one member of each such clutch being connected in driving relation with a wheel of the tractor and the companion members being both mounted in constant driving relation on the propeller shaft and arranged to be normally held in engagement with the wheel-connected members, and a single shifting yoke for both clutches positioned therebetween.

5. In a tractor, a propeller shaft, a pair of clutches thereon, one member of each such clutch being connected in driving relation with a wheel of the tractor and the companion members being both mounted in constant driving relation on the propeller shaft and arranged to be normally held in engagement with the wheel-connected members, a single shifting yoke for both clutches, a rotatable shaft operatively connected with the yoke to shift the same, brake bands on the wheel-connected members of the clutches, and operative connections, between the shaft and brake bands to clamp either one at a time on its clutch member when the corresponding companion member is disengaged.

In testimony whereof I affix my signature in presence of two witnesses.

JOHN MINOR KROYER.

Witnesses:
 VERADINE WARNER,
 STEPHEN M. BLEWETT.